United States Patent [19]

Hogg, Jr. et al.

[11] 4,305,062
[45] Dec. 8, 1981

[54] PORTABLE ALARM FOR SPORTSMEN

[76] Inventors: Luther R. Hogg, Jr., Station 9-1/2 Osceola Ave., Sullivans Island, S.C. 29482; Robert J. Mulholland, P.O. Box 191, Huntington, W. Va. 25707

[21] Appl. No.: 125,023

[22] Filed: Feb. 27, 1980

[51] Int. Cl.³ .......................... B60Q 7/00; G08B 5/00
[52] U.S. Cl. .............................. 340/309.1; 340/321; 340/90; 340/107
[58] Field of Search ...................... 340/309.1, 321, 87, 340/107, 330

[56] References Cited

U.S. PATENT DOCUMENTS 2,477,857 8/1949 Boeve .............................. 340/309.1
4,129,857 12/1978 Espinosa ............................. 340/321

Primary Examiner—Harold I. Pitts
Attorney, Agent, or Firm—Harvey B. Jacobson

[57] ABSTRACT

A self-contained portable unit can be positioned in a visible location in a sportsman's car. The unit includes a timer which can be preset to the length of time for which the sportsman expects to be away from his vehicle. Once the length of time has expired, the timer initiates operation of a flashing warning light and an audible horn alarm. It also provides current to an illumination light which shines on a prepositioned card containing the sportman's expected route and destination. In this manner, if the sportsman is injured or lost, a search party can be sent to locate him immediately upon the actuated warning device being found by a passerby.

6 Claims, 7 Drawing Figures

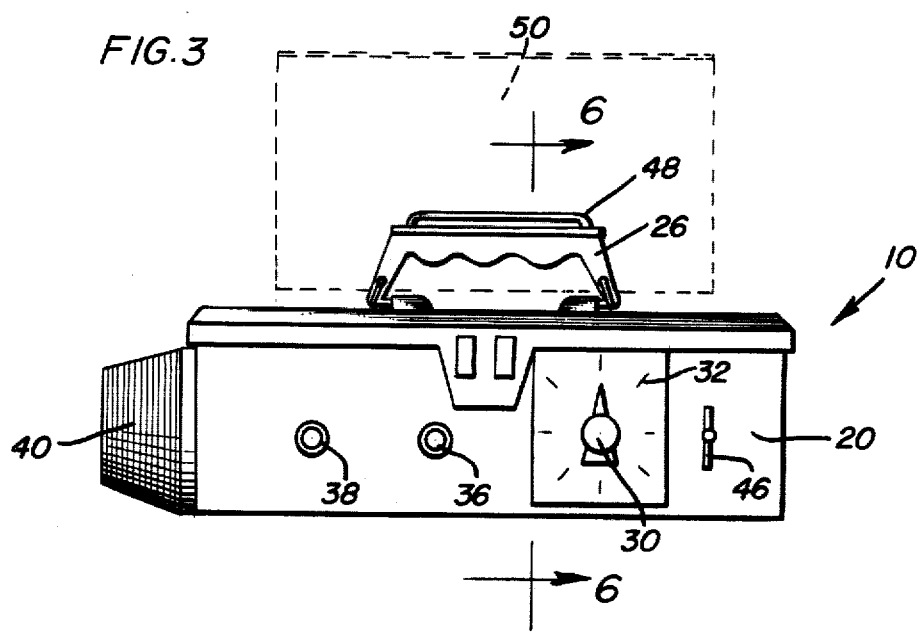
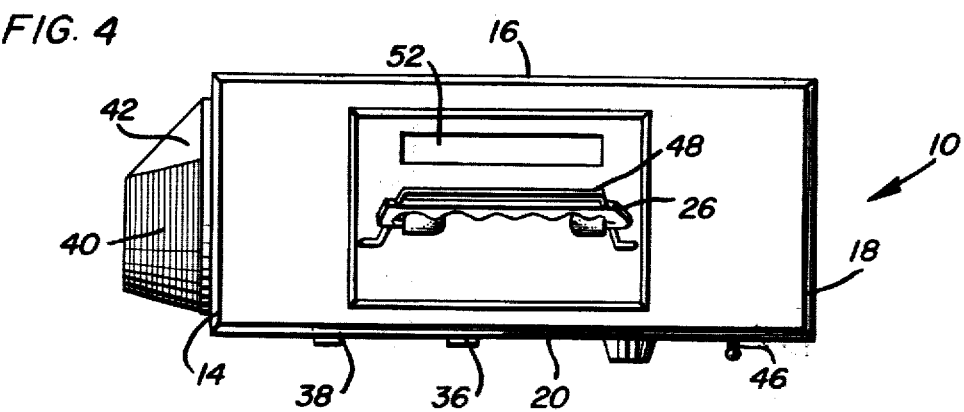
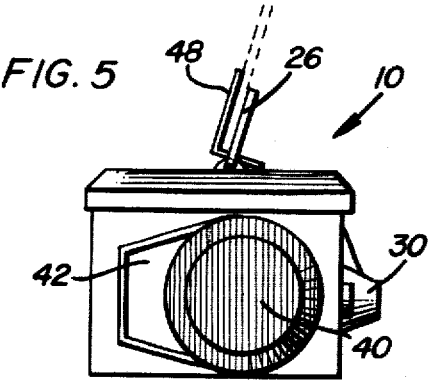
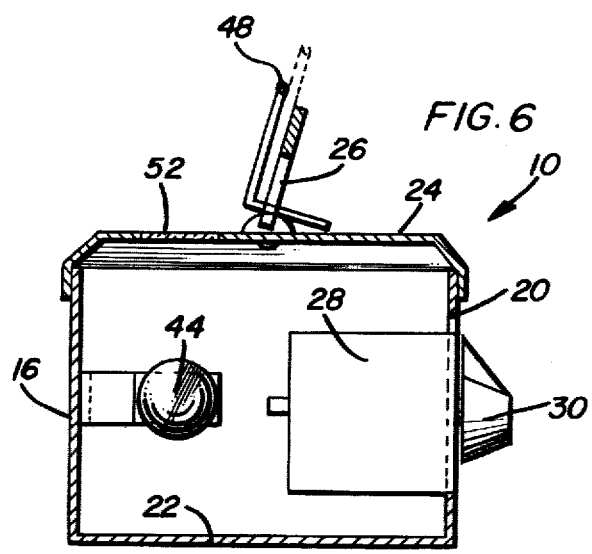

PORTABLE ALARM FOR SPORTSMEN

BACKGROUND OF THE INVENTION

1. Field of the Invention

This invention relates to warning devices and particularly to portable alarm devices which are capable of being set to operate after a predetermined time interval.

2. Description of Related Art

One of the hazards encountered by a sportsman, such as a boater or hunter who sets out on a trip of a selected duration and who encounters unforeseen and unexpected difficulties and is unable to return at the expected time, is the inability to communicate such difficulties as well as his location to that rescue or assistance may be rendered. When unforeseen mishaps do occur, a lack of knowledge as to the whereabouts or routes taken by the sportsman can make rescue attempts extremely difficult, prolonging them so that they may last for several days and frequently these attempts end as disasters, as injury and even death may occur before the rescuers arrive on the scene.

U.S. Pat. No. 3,056,954, issued Oct. 2, 1962 to Jorritsma discloses a portable signal device which may be worn by individuals and which may be actuated by the user when lost. The device includes a flashing light and an audible horn alarm to signal the location of the lost individual. U.S. Pat. No. 3,323,117, issued May 30, 1967 to Mason discloses a visual marker or beacon. A plurality of the devices are carried by a hiker or other sportsman and are placed periodically along the path of travel to provide an indication of the fastest course leading to a prescribed area. U.S. Pat. No. 4,012,732, issued Mar. 15, 1977 to Herrick shows a security device to be used by people who are old or live alone. The device includes a clock which measures one or more preselected time periods and is adapted to actuate an alarm when a preselected time period has elapsed to indicate inactivity in the dwelling.

SUMMARY OF THE INVENTION

The present invention comprises a portable alarm device having a housing enclosing a presettable timer which is connected to both an audible and a visual alarm. The timer also causes illumination of a trip information card which sits atop the device. The device is sufficiently small to enable it to be placed on the dashboard of an automobile thereby prominently displaying the trip card in the automobile windshield. The device is battery powered and includes an auxiliary input for connection to the automobile battery to insure a sufficient energy supply for the alarm system. When a sportsman leaves on his journey, he merely jots his trip plan on the trip card and sets the timer for the expected duration of the journey. At the end of the preselected time span, if the sportsman has not returned to shut the device off, the audible and visual alarms are actuated thereby drawing attention to the device. The trip plan is illuminated and gives an observer a clear indication of the expected whereabouts of the sportsman.

Accordingly, one object of the present invention is to provide a new and novel portable automatic alarm device for sportsmen.

A further object of the present invention is to provide a portable automatic alarm device for sportsmen which produces both audible and visual alarms at the end of a preselected time period.

Another object of the present invention is to provide a portable automatic alarm device for sportsmen which can easily be carried by the sportsman and left in an accessible and obvious position at the sportsman's point of departure.

A still further object of the present invention is to provide an automatic portable alarm device which can operate either from a self-contained battery pack or from an external source of electrical power.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the portable alarm device for sportsmen.

FIG. 4 is a top plan view of the portable alarm device for sportsmen.

FIG. 5 is an end elevational view of the portable alarm device for sportsmen.

FIG. 6 is an end sectional view taken substantially along a plane passing through section line 6—6 of FIG. 3.

DESCRIPTION OF THE PREFERRED EMBODIMENT

Figure 1:
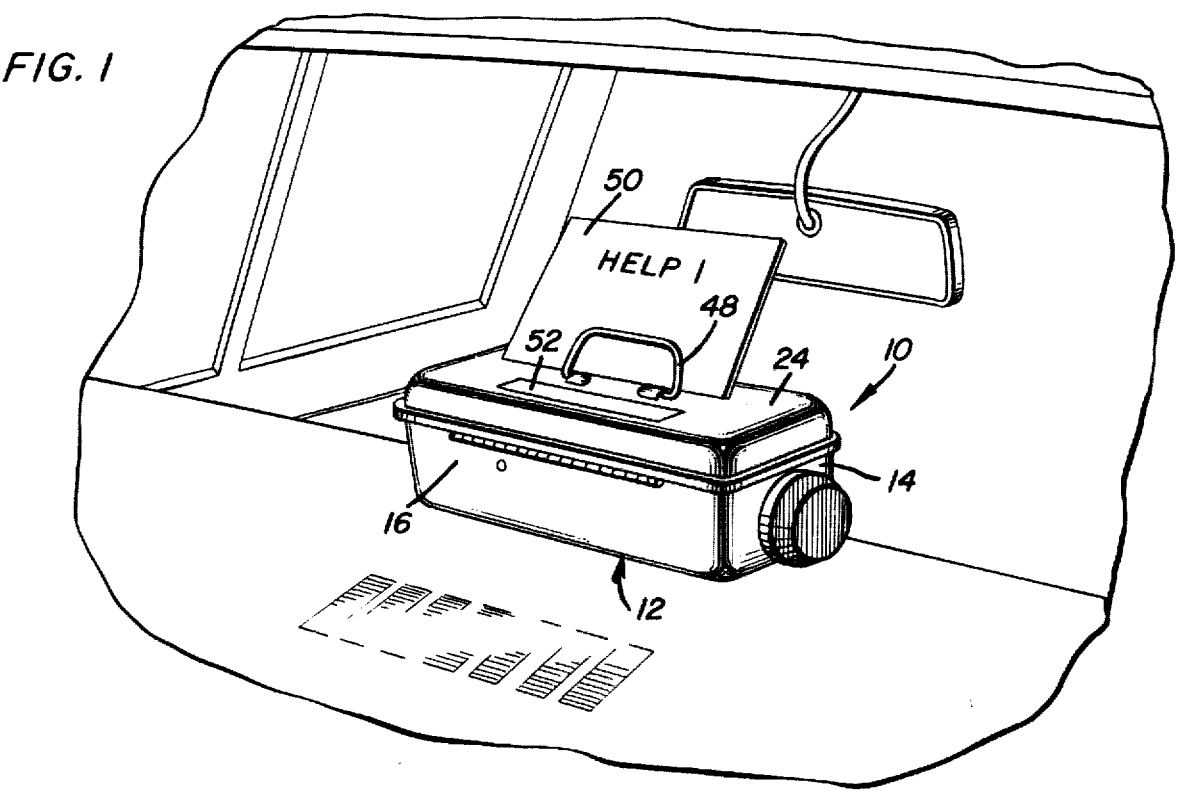
FIG. 1 is a perspective view of the portable alarm device for sportsmen as seen positioned on the dashboard of an automobile.
Figure 2:
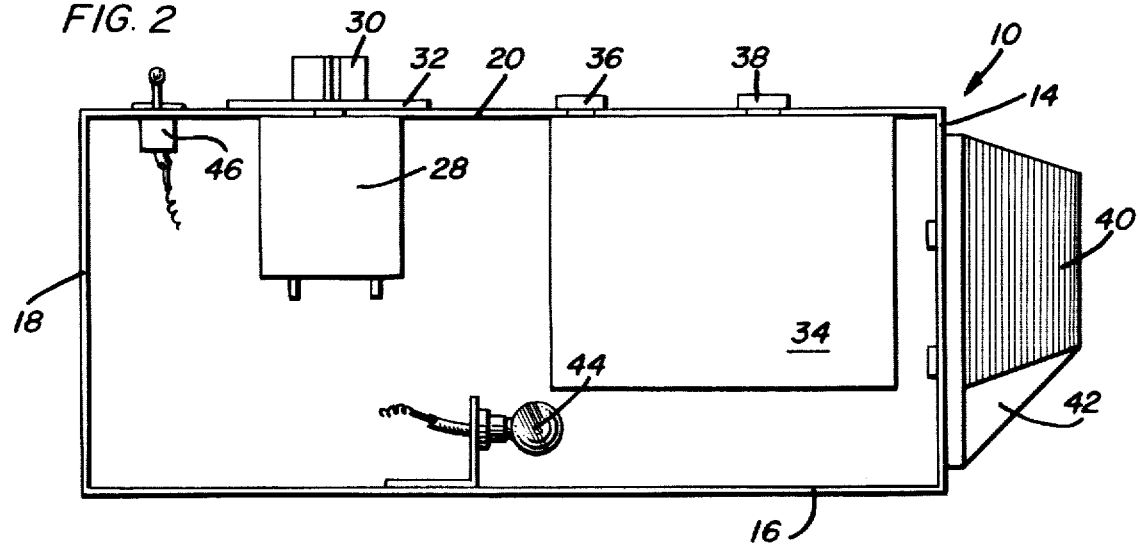
FIG. 2 is a top plan view of the interior of the portable alarm device for sportsmen showing the positioning of the various elements therein.

Now with reference to the drawings, the portable alarm device generally referred to by the numeral 10 will be described in detail. With particular reference to FIGS. 1-6, it can be seen that the alarm device includes a housing generally referred to by the numeral 12. The housing 12 includes four upstanding side walls 14, 16, 18 and 20, together with a base 22 and a hinged top 24. The housing 12 may be made of any suitable material such as plastic, metal or the like, and the preferred embodiment is formed from rigid plastic material such as polyethylene, PVC or the like. The alarm device is of a size providing ready portability so as to be carried by an individual and is preferably provided with a carrying handle 26 suitably mounted to the top 24 as shown.

The alarm device includes a mechanical timer 28 which is located inside the housing 12 and further includes an indicator knob 30 which protrudes from housing wall 20. Knob 30 is disposed over indicator dial 32 which is provided with gradations for indicating the length of time for which the timer 28 is set. The timer 28 can be a conventional spring powered timer which is set by rotating the knob 30. When the timer has "timed out", it closes a switch to activate the alarm device as will be described hereinafter.

Also included in the housing 12 is a battery 34 having externally accessible positive and negative terminals 36 and 38, respectively. Battery 34 is connected by appropriate wiring to a flashing light 40 which is preferably red in color and mounted exteriorly of the housing on wall 14. Battery 34 is also connected to a suitable audible alarm such as horn 42 which is disposed adjacent light 40 on the outside of wall 14. A clear or white light 44 is mounted within the housing 12 as well as an on-off toggle switch 46 which has an actuation lever extending out of the housing through wall 20.

Attached to the handle 26 is a holder 48 formed from wire. Holder 48 cooperates with handle 26 to contain and hold upright a trip plan card 50. Trip plan card 50 contains the trip plan of the sportsman and can include any information deemed necessary in the event of an emergency. The trip plan card 50 is illuminated to facilitate the reading thereof by light 44 shining through an opening 52 disposed in the top 24 of the portable alarm 10. Opening 52 can be covered with any transparent material and is disposed between light 44 and the face of the trip plan card.

Figure 7:
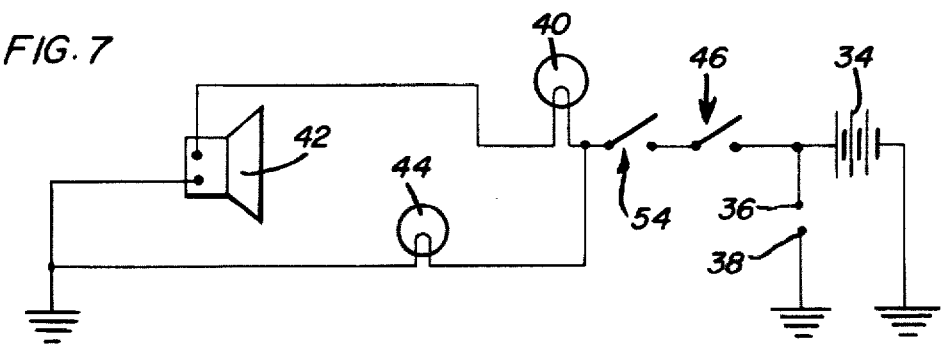
FIG. 7 is a schematic drawing of the electrical circuit of the invention.

Now with reference to FIG. 7, the specific wiring arrangement of the portable alarm device will be described. It can be seen that battery 34 is connected in parallel with terminals 36 and 38 which, as described above, are for connection to an external power source such as an automobile battery. On-off toggle switch 46 is connected in series with battery 34 and with switch 54 which is actuated by timer 28. Flashing light 40 is connected in series circuit with horn 42. This series combination is in parallel with clear illuminating light 44. It will be understood that flashing light 40 is a standard flashing light with a flashing unit built in. Obviously, upon closure of switch 46 and of switch 54 through the timing out of timer 28, current is supplied to flashing light 40, horn 42 and illuminating bulb 44. Flashing light 40 and horn 42 will attract the attention of any passersby in the area while illuminating light 44 will illuminate the trip plan card 50 through clear opening 52. The information imprinted upon trip plan card 50 will include at least the names of the sportsmen who are presently overdue in returning, together with an outline of the route which the sportsmen planned to take and instructions to summon help and rescue for the persons indicated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable alarm device comprising:
   a housing including a hingedly-connected lid for facilitating access into an interior portion of said housing, said lid having a handle means fixedly secured to an external portion thereof;
   first alarm means for providing a visual alert to passersby, said first alarm means being operably attached to said housing;
   second alarm means for providing an audio alert to passersby, said second alarm means being operably attached to said housing;
   power supply means operably associated with said alarm device for facilitating an activation of said first and second alarm means;
   timer means for permitting an operator to choose a set period of time at an end of which said first and second alarm means may be supplied with power so as to activate the same;
   first switch means for controlling a supplying of said power from said power supply means to said first and second alarm means, said switch means being manually operable;
   second switch means for controlling a supplying of said power from said power supply means to said first and second alarm means, said second switch means being controlled by said timer means, said power being suppliable to said first and second alarm means when both said first and second switch means are closed;
   information form means for providing information to said passersby when said passersby respond to an activation of said first and second alarm means;
   an information form means holder, said holder including a slot formed in said handle means to facilitate a secure positioning of said information form means in said holder; and
   illumination means for illuminating said information form means in response to an activation of said first and second alarm means.

2. The portable alarm device as defined in claim 1, wherein said power supply means includes a portable battery securably retained within said housing and further includes external power supply jacks to permit a selective use of an external power source in lieu of said battery.

3. The portable alarm device as defined in claim 2, wherein said first alarm means includes a flashing light and said second alarm means includes a horn device.

4. The portable alarm device as defined in claim 3, wherein said illumination means includes an incandescent lamp positioned interiorly of said housing and a transparent window on said lid, said transparent window permitting light emitted from said incandescent lamp to reflect upon said information form means thereby to illuminate said information form means to facilitate visual observation of the same by said passersby.

5. The portable alarm device as defined in claim 4, wherein said information form means holder includes a wire holding member fixedly secured to said handle means and being in parallel alignment therewith, said slot being formed between said wire holding member and said handle means.

6. The portable alarm device as defined in claim 5, wherein said timer means is positioned interiorly of said housing and includes a control shaft extending through an aperture in said housing, said control shaft having a calibrated dial and knob associated therewith on an exterior portion of said housing so as to permit an operator to set said period of time from an external position relation to said alarm device.

* * * * *